Sept. 24, 1940.   D. F. JONES ET AL   2,215,510
HEATER
Filed Oct. 4, 1937   2 Sheets-Sheet 2

INVENTOR.
DON F. JONES
and
JOHN W. MILLER
BY
Carroll R. Taber
ATTORNEY.

Patented Sept. 24, 1940

2,215,510

UNITED STATES PATENT OFFICE 2,215,510

HEATER

Don F. Jones and John W. Miller, Lansing, Mich., assignors to Motor Wheel Corporation, Lansing, Mich., a corporation of Michigan Application October 4, 1937, Serial No. 167,142

1 Claim. (Cl. 126—56)

This invention relates to space heaters for rooms of relatively small size, and more particularly to heaters for camping trailers.

In camping trailers of the type that are to be towed by an automobile, it is necessary that all equipment placed therein shall be made as compact as possible. Consequently it is essential that the heater for a trailer of this type shall have a very high efficiency and yet occupy but little space in the trailer. It is also advisable that the heater be so installed in the trailer that the products of combustion will be discharged into the outside atmosphere in order that the air within the trailer will not be vitiated.

It is accordingly an object of the invention to provide a small heater with a high efficiency.

Another object of the invention is to provide a heater that may take the air necessary for combustion from outside of the space to be heated.

Another object of the invention is to provide a heater, the radiating portion of which is contained within a casing or cabinet, thus protecting the occupants of the trailer, and the equipment placed therein, from the intense heat of the heating unit.

Another object is to provide a means for heating the air admitted into the trailer for ventilation, prior to its circulation within the trailer.

A still further object is to provide a compact heater of attractive appearance with all parts enclosed within a cabinet but with such parts readily accessible.

Other objects of the invention will appear in the following specification when read in connection with the accompanying drawings wherein like reference numerals designate corresponding parts in the several views.

Figure 1:
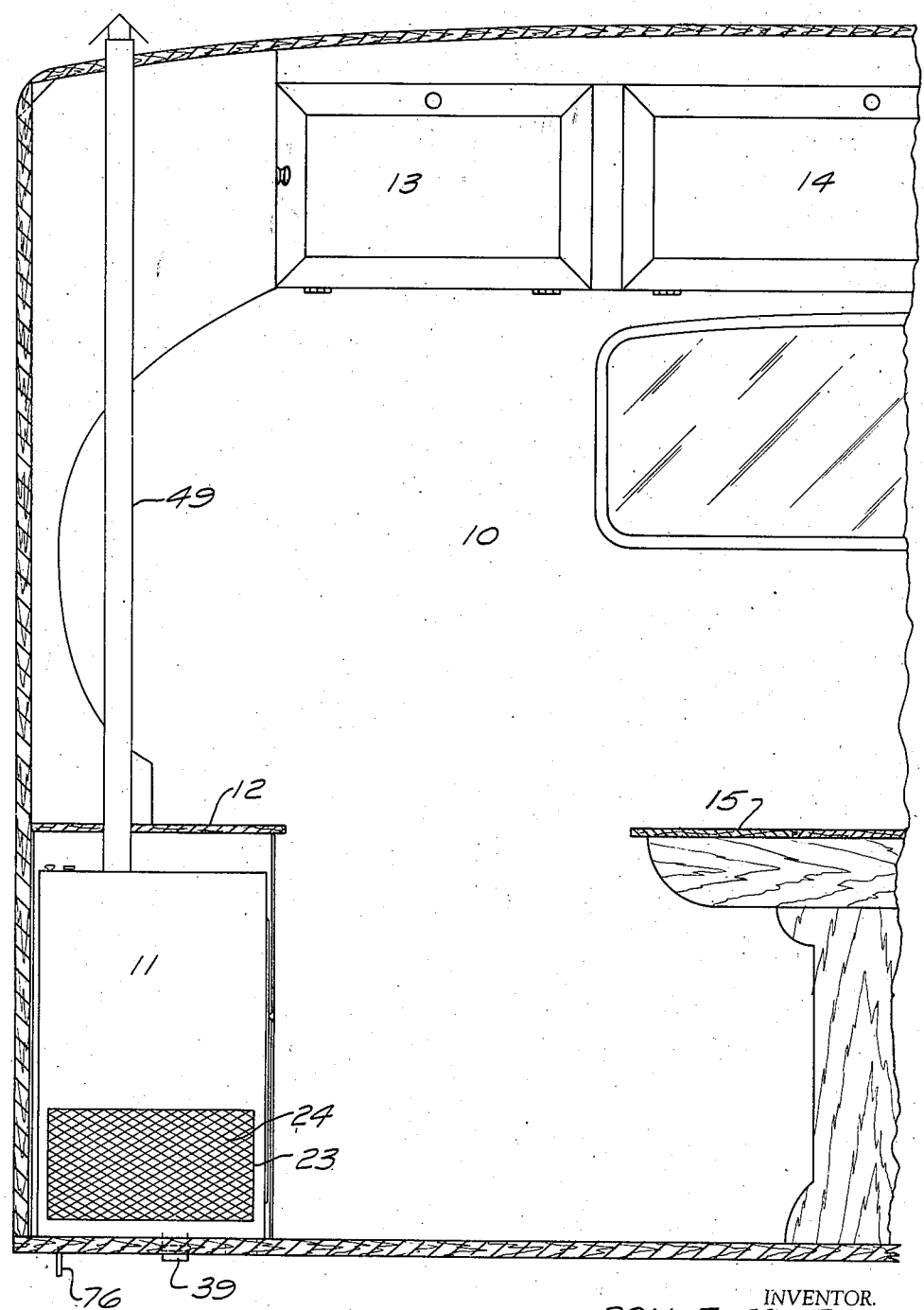
Figure 1 is a fragmentary cross sectional view of a trailer embodying our invention.

Referring now to the drawings and more particularly to Figure 1 thereof, there is shown a camping trailer 10 having a heater 11 mounted therein. The trailer also has built in cabinets 12, 13 and 14, and a table 15. The cabinets and table are not a part of our invention, but are shown merely for purposes of comparison, thus indicating the relative size of the heater. It is, of course, obvious that the size of the heater may be varied, but its compactness is plainly indicated.

Figures 2, 3, 4:
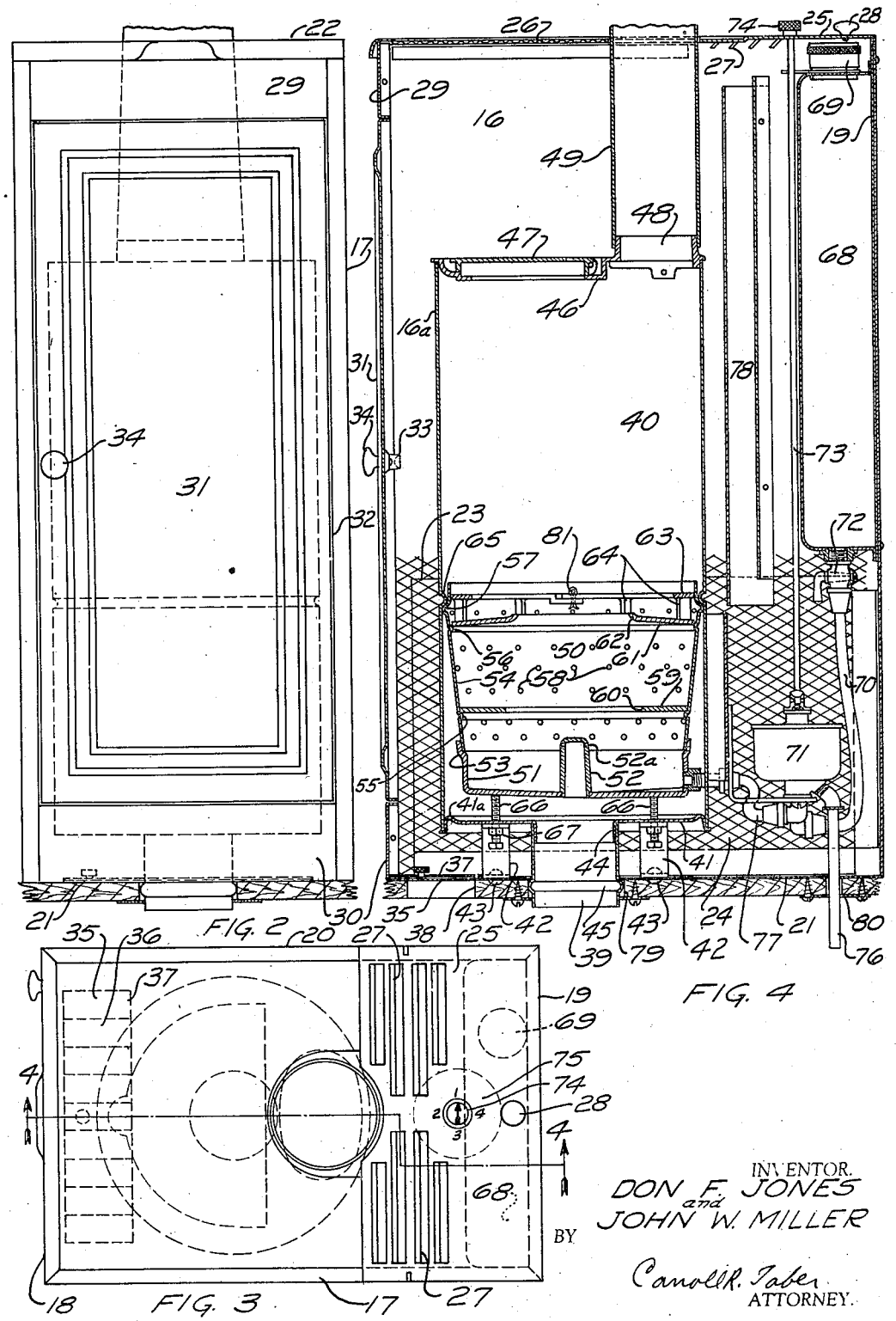
Figure 2 is a front elevation of a heater constructed in accordance with this invention.
Figure 3 is a top plan view of the heater shown in Figure 2.
Figure 4 is a cross-sectional view taken on substantially the line 4—4 of Figure 3.

Figures 2, 3 and 4 show the details of the heater. A cabinet 16, which may be decorated in any suitable manner in order to enhance its appearance, encloses a heating unit 16a. The heating unit is thus concealed, and the occupants and the equipment of the trailer are protected from the direct heat of the heating unit 16a or from contact with the heating unit. This cabinet 16 is made principally from sheet steel panels forming the four walls 17 18 19 and 20 the bottom wall 21 and a portion of the top wall 22. The side wall 20 of the cabinet 16 has a relatively large opening 23 near its bottom, which allows cool air from near the floor of the trailer to enter the cabinet and be warmed by the heating unit. This opening 23 is covered by a grille 24 which conceals the heating unit within the cabinet 16 yet allows the air to pass into the interior of the cabinet.

The top wall 22 of the cabinet 16 consists of a plate 25 and a grille 26. The grille 26 forms the front portion of the top wall 22 and provides openings for the passage of warm air from the cabinet out into the interior of the trailer. The plate 25 completes the top wall 22 and has a plurality of elongated louvres 27 therein which provide additional outlets for heated air. The louvres 27 are formed by slitting the steel panel and bending the metal bounded by the slits downwardly, as best seen in Figure 4. This plate 25 is preferably hinged at its forward edge to the side walls 17 and 20 in order to provide access to the interior of the cabinet, and a latch 28 is provided to hold the plate 25 in closed position.

The front wall 18 of the cabinet 16 consists of two narrow sheet steel panels 29 and 30 at the top and bottom respectively of said cabinet. A rectangular opening is thus left in the front of the cabinet which is closed by a door 31 hinged at one vertical edge 32 to allow access to the interior of the cabinet from the front. A latch 33, controlled by a knob 34, is located on the door 31 in order to hold the door in closed position.

The grille 24 on the side wall, and the grille 26 in the top of the cabinet, are mounted in place in such a manner as to be readily removed if desired. It will be apparent, therefore, that all of the apparatus within the cabinet 16 is readily accessible. Access to the side may be gained through opening 23; to the top through the opening that is normally covered by grille 26 and plate 25; and to the front through door 31.

The rear wall 19 and the side wall 17 are solid sheet steel panels rigidly secured to the adjacent walls.

The bottom wall 21 of the cabinet 16 has a plurality of elongated slots 35 which may be opened or closed by a slotted plate 36. The plate 36 has a plurality of slots 37 therein and is mounted in guides so as to be slidable transversely of the cabinet. Thus, the slots 37 in the plate 36 may register with the slots 35 in the bottom wall 21, or may be moved out of registry with the slots 35 in order to close the openings in the bottom wall 21. An opening 38 is cut in the floor of the trailer beneath the plate 36 so that when the slots 35 and 37 are in registry, air may enter the cabinet from outside of the trailer in order to provide ventilation for the interior thereof. The bottom wall 21 of the cabinet 16 is also provided with openings for the reception of a duct 39 and a pipe 76, which will be described later.

The heating unit comprises a combustion chamber 40 and a burner 50. The combustion chamber is formed from sheet steel bent into cylindrical form. The upper portion of the cylindrical shell thus formed constitutes the combustion chamber proper and the lower portion serves as an air compartment or housing for the burner. The sheet metal cylinder is closed at the bottom by a sheet steel bottom plate 41. The plate 41 is circular, and is provided with a continuous annular flange 41a at its periphery. The flange 41a is formed to fit snugly within the lower end of the cylinder that forms the combustion chamber 40, and is preferably welded thereto whereby an oil-tight joint is formed. The central portion of the plate 41 just inwardly of its periphery is depressed slightly to form a pan to catch any oil overflowing from the burner. The center of the plate 41 is provided with an opening and the metal surrounding the opening is pressed downwardly to form a flange 44. Secured to the flange 44 is a duct 39 that passes through a hole 79 in the trailer floor. The duct 39 has an annular rib 45 which seats against the lower face of the bottom wall 21 of the cabinet 16.

The duct 39 provides a passage that allows air for combustion to enter the burner and at the same time allows any oil that might accidentally spill from the burner to flow out of the trailer without in any way adding to the danger from fire. The particular construction of the lower end of the cylinder in which the burner is mounted is such that there is no possibility of escape of oil into the trailer.

Attached to the under side of the bottom plate 41 are the legs 42, which are generally U-shaped, with the legs of the U flanged outwardly for attachment to the bottom wall of the cabinet by rivets 43. The legs are provided with threaded apertures for the reception of bolts 66 on which the burner unit is adapted to rest. The bolts are provided with lock nuts 67 to prevent the loosening of the bolts 66 by the motion of the trailer.

The upper end of the cylindrical combustion chamber 40 is closed by a cast iron top 46, having an opening therein which is closed by a hinged lid 47 which may be raised to allow the fire in the burner 50 to be lighted. The top 46 also has an opening defined by a flange 48 to which a chimney 49 is secured. This arrangement allows the products of combustion generated in the burner to pass out of the trailer.

The combustion chamber 40 may be used as a cooking range as well as a heater for the trailer. The top 46 is flat in order to support a cooking vessel, and access to the top 46 may be had either through the door 31 or through the opening in the top of the cabinet 16 after removing the grille 26.

Mounted at the lower part of the combustion chamber 40 is a burner 50 which rests on the bolts 66. The burner 50 comprises a bottom pan 51 which has an annular shoulder 53 near its upper edge. The pan 51 also has a central opening which is closed by a tube 52 brazed to the metal around the opening. The tube 52 is closed at its upper end and has a plurality of apertures 52a therein for the passage of air into the burner. Seated on the shoulder 53 is a wall portion 54 which is of substantially frusto-conical shape and is provided with three annular ribs 55, 56 and 57 respectively. Resting on the rib 55 is a partition 59 which has a large central opening 60 therein. A top wall 61, having a large central opening 62, rests on the intermediate rib 56. Supported on the top wall 61 by a plurality of radially extending vanes 64 is an annular baffle ring 63. The baffle ring is made in two semi-circular sections which are secured together by cotter keys 81. The walls of the burner are provided with a plurality of small apertures 58, which allow air for combustion to enter the burner. The burner is placed in the combustion chamber with the rib 57 seating beneath a rib 65 in the wall of the combustion chamber 40, and it is forced against said rib 65 by the bolts 66.

Secured to the rear wall of the cabinet 16 is a fuel tank 68 having a removable cap 69 in the top wall. The cap may be removed in order that the tank may be filled with fuel. A pipe 70 leads from the bottom of the fuel tank to the control chamber 71 and another pipe 77 leads from the control chamber 71 to the burner 50. A valve 72 is inserted in the pipe 70 in order that the flow of fuel to the burner may be completely shut off. An over flow pipe 76 leads from the control chamber 71 through a hole 80 in the floor of the trailer whereby overflow fuel may be discharged onto the ground. The control 71 is conventional, but is preferably of the type where there is a float valve for controlling the fuel level therein. A metering valve (not shown) within the control chamber is connected by a rod 73 to a knob 74 in the top wall of the cabinet so that the flow of fuel to the burner may be controlled from the exterior of the cabinet. A dial 75 surrounds the knob 74 in order that the control may be readily set to deliver a certain quantity of fuel.

A baffle or reflector 78 is interposed between the combustion chamber 40 and the fuel tank 68. A baffle is necessary to prevent the fuel in the tank from being overheated.

In the operation of the burner, fuel enters the burner from the fuel tank and flows on to the bottom of the pan 51. After the fuel is ignited, the heat from the flame induces a draft in the chimney 49, thereby drawing fresh air for combustion into the interior of the burner through the duct 39 and the apertures 52a and 58. It will be apparent, therefore, that the air for combustion is taken from outside of the trailer and the products of combustion are discharged into the outside atmosphere. Also the cool air from near the floor of the trailer enters the cabinet through the grille 24, is heated and passed out through the grille 26 and louvres 27. Fresh air for ventilation is obtained through the opening 38 in the trailer floor and the slots 35 and 37 in the bottom wall of the cabinet. Consequently all the air that is admitted into the trailer is heated prior to its circulation therein, so that the occupants of the trailer will experience no cold drafts from open windows.

The heater herein disclosed assures the utmost safety to the trailer and its occupants. The heating unit 16a is completely sealed with respect to the interior of the trailer so that no noxious fumes are ever released therein. There is no possibility of oil spilling onto the floor of the trailer, for any overflow in the control or in the burner is carried off through pipe 76 or duct 39 respectively. In addition to these features, the heating unit is effectively shielded by the cabinet 16 in order that the radiant heat cannot ignite any nearby objects.

A further distinct advantage of the construction shown lies in the natural control of the draft during movement of the trailer. It is often desired to operate the heater while the trailer is in motion, and normally there is a tendency for the natural draft to be increased by the eductive effect of the air flowing by it. This tendency to increase the draft is balanced, however, by the eductive effect of the air flowing by the duct 39. As a result, the draft will remain substantially constant even during rapid motion of the trailer.

It will be apparent from the foregoing that we have invented a heater which is a decided improvement in the art. The heater specifically described in this application, however, is susceptible of many variations which will be apparent to those skilled in the art, and consequently, we wish to be limited only by the scope of the appended claim.

We claim:

In combination with a vehicle trailer having side walls, a floor, and a roof, an oil burning heater for said trailer comprising an inner casing sealed against escape of vapors therefrom into said trailer, a flue outlet from the casing extending through the trailer roof, an air inlet duct extending from the bottom of said casing through the trailer floor, a burner of the vaporizing pot type within said casing, means for supplying liquid fuel to said burner including a fuel control device, said means being sealed against the escape of fuel into said trailer, said control having a fuel overflow pipe extending through the trailer floor, and an outer casing spaced from and surrounding the walls of the inner casing.

DON F. JONES.
JOHN W. MILLER.